(12) United States Patent
Armiyoon et al.

(10) Patent No.: US 12,397,726 B2
(45) Date of Patent: Aug. 26, 2025

(54) INTEGRATED TIRE LONGITUDINAL AND LATERAL FORCE ESTIMATION METHODOLOGY

(71) Applicant: GM Global Technology Operations LLC, Detroit, MI (US)

(72) Inventors: Ali Reza Armiyoon, Markham (CA); Yubiao Zhang, Sterling Heights, MI (US); Hualin Tan, Novi, MI (US); Seyedalireza Kasaiezadeh Mahabadi, Novi, MI (US); Jin-Jae Chen, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 189 days.

(21) Appl. No.: 18/455,057

(22) Filed: Aug. 24, 2023

(65) Prior Publication Data

US 2025/0065828 A1    Feb. 27, 2025

(51) Int. Cl.
*B60R 16/023* (2006.01)
*G01M 17/02* (2006.01)

(52) U.S. Cl.
CPC ......... *B60R 16/0231* (2013.01); *G01M 17/02* (2013.01)

(58) Field of Classification Search
CPC . B60R 16/0231; B60T 8/172; B60T 8/17551; G01M 17/02; B60G 17/0195; B60W 40/101; B60W 40/04; B60W 40/103; B60W 40/13; B60W 30/02; B61L 15/0081; B60D 6/005
See application file for complete search history.

(56) References Cited

U.S. PATENT DOCUMENTS

| | | | | |
|---|---|---|---|---|
| 6,549,842 | B1* | 4/2003 | Hac | B60T 8/172 73/9 |
| 10,124,809 | B2* | 11/2018 | Thor | B60T 8/17551 |
| 11,731,477 | B2* | 8/2023 | Weston | B60G 17/0195 267/220 |
| 2006/0106516 | A1* | 5/2006 | Pick | B62D 6/005 701/41 |
| 2009/0177346 | A1* | 7/2009 | Hac | B60W 40/13 701/31.4 |
| 2013/0030648 | A1* | 1/2013 | Matsumoto | B60W 30/02 701/1 |

(Continued)

FOREIGN PATENT DOCUMENTS

DE    102021130680 A1    6/2022
DE    102022123529 A1    6/2023

*Primary Examiner* — Yuri Kan
(74) *Attorney, Agent, or Firm* — Vivacqua Crane, PLLC (57) ABSTRACT

A method for estimating lateral force includes receiving vehicle data. The vehicle includes a plurality of tires. The method further includes using a bicycle model to determine first lateral forces at each of the plurality of tires of the vehicle, using a double-track model to determine second lateral forces at each of the plurality of tires of the vehicle, fusing the first lateral forces determined using the bicycle model and the second lateral forces using the double-track model to determine third lateral forces at each of the plurality of tires of the vehicle, and controlling an actuator of the vehicle using the third lateral forces at each of the plurality of tires of the vehicle.

20 Claims, 2 Drawing Sheets

(56) References Cited

U.S. PATENT DOCUMENTS

| | | | |
|---|---|---|---|
| 2015/0210300 A1* | 7/2015 | Jung | B61L 15/0081 |
| | | | 701/19 |
| 2020/0331520 A1* | 10/2020 | Varunjikar | B60W 40/103 |
| 2021/0323545 A1* | 10/2021 | Jang | B60W 40/04 |
| 2023/0219561 A1* | 7/2023 | El-Shaer | B60W 40/101 |
| | | | 701/23 |
| 2024/0302247 A1* | 9/2024 | Ko | G01M 17/02 |

* cited by examiner

INTEGRATED TIRE LONGITUDINAL AND LATERAL FORCE ESTIMATION METHODOLOGY

INTRODUCTION

The present disclosure relates to methods and systems for integrated tire longitudinal and lateral force estimation.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Most automotive vehicles include tires. These tires are subjected to longitudinal and lateral forces that affect vehicle dynamics. The control of some vehicle actuator may depend on the tire longitudinal and lateral forces. It is therefore desirable to estimate the tire longitudinal and lateral forces. The longitudinal tire forces are not considered in estimating lateral tire forces. When the difference in longitudinal tire force between corners or each side of the vehicle is significant (which may occur due to torque vectoring, road conditions, or lateral load transfer), the simplified bicycle model is not capable of accurately estimating lateral tire forces.

SUMMARY

To accurately estimate lateral tire forces, the present disclosure describes a more comprehensive latera dynamics model to incorporate the effects of the longitudinal tire forces. The presently disclosed method uses multiple criteria to detect conditions when the longitudinal tire forces are not accurate as well as when the external yaw moment is of significance. The external yaw moment of significance refers to the external yaw moment resulting from difference in longitudinal forces on each side/corner. The presently disclosed method also includes a fusion logic to create a smooth transition between two methods (i.e., the simplified bicycle model and double-track comprehensive lateral force estimation model).

In an aspect of the present disclosure, the method for estimating lateral tire forces includes receiving data of a vehicle. The vehicle includes a plurality of tires. The method includes using a bicycle model to determine first lateral forces at each of the plurality of tires of the vehicle, using a double-track model to determine second lateral forces at each of the plurality of tires of the vehicle, and fusing the first lateral forces determined using the bicycle model and the second lateral forces using the double-track model to determine third lateral forces at each of the plurality of tires of the vehicle. The method further includes controlling an actuator of the vehicle using the third lateral forces at each of the plurality of tires of the vehicle.

The vehicle data includes a plurality of wheel slips at each of the plurality of tires of the vehicle. In other aspects of the present disclosure, the method may further include determining a maximum wheel slip of the plurality of wheel slips at each of the plurality of tires of the vehicle, determining an absolute value of the maximum wheel slip, and comparing the absolute value of the maximum wheel slip with a predetermined wheel-slip threshold to determine whether the absolute value of the maximum wheel slip is less than the predetermined wheel-slip threshold. The vehicle data includes vehicle speed. The method further may include comparing the vehicle speed of the vehicle with a predetermined speed threshold to determine whether the vehicle speed of the vehicle is greater than the predetermined speed threshold. The vehicle data includes a yaw moment resulting from the longitudinal forces at each of the plurality of tires of the vehicle. The method further may include comparing the yaw moment resulting from the longitudinal forces at each of the plurality of tires of the vehicle with a predetermined moment threshold to determine whether the yaw moment resulting from the longitudinal forces at each of the plurality of tires of the vehicle is greater than the predetermined moment threshold. The first lateral forces at each of the plurality of tires of the vehicle and the second lateral forces at each of the plurality of tires of the vehicle are determined solely in response to determining that: (a) the absolute value of the maximum wheel slip is less than the wheel-slip threshold, (b) the vehicle speed of the vehicle is greater than the predetermined speed threshold, and (c) the yaw moment resulting from the longitudinal forces at each of the plurality of tires of the vehicle is greater than the predetermined moment threshold. The second lateral forces at each of the plurality of tires of the vehicle includes a lumped lateral force in a front axle of the vehicle, and the double-track model uses the following equations:

$$F_{yf} = \frac{1}{\cos\delta_f}\left(\frac{ma_y L_r + I_{zz}\dot{r} - M_z^{EXT}(F_{x_{i,j}})}{L_f + L_r} - F_{xf}\sin\delta_f\right)$$

$$F_{yr} = \frac{1}{\cos\delta_r}\left(\frac{ma_y L_f - I_{zz}\dot{r} + M_z^{EXT}(F_{x_{i,j}})}{L_f + L_r} - F_{xr}\sin\delta_r\right)$$

where:
$F_{yf}$ is the lumped lateral force in the front axle of the vehicle;
m is a mass of the vehicle;
$a_y$ is a lateral acceleration of the vehicle;
$\dot{r}$ is a yaw acceleration of the vehicle;
$L_r$ is a distance from the rear axle to a center of gravity of the vehicle;
$I_{zz}$ is a yaw moment of inertia of the vehicle;
$M_z^{EXT}$ is the yaw moment resulting from tire longitudinal forces on the vehicle;
i refers to a left tire or a right tire of the vehicle;
j refers to a front tire or a rear tire of the vehicle;
$F_{x_{i,j}}$ is a tire longitudinal force at an axle j and a tire i;
$F_{xf}$ is the lumped longitudinal force in the front axle of the vehicle;
$\delta_f$ is a front wheel steering angle on a road; and
$L_f$ is a distance from the front axle to the center of gravity of the vehicle;
$F_{yr}$ is the lumped lateral force in the rear axle of the vehicle;
$F_{xr}$ is the lumped longitudinal force in the rear axle of the vehicle; and
$\delta_r$ is a rear wheel steering angle on a road.

Fusing the first lateral forces determined using the bicycle model and the second lateral forces using the double-track model including using a low pass filter. The low pass filter has a first convergence rate for the falling edge, the low pass filter has a second convergence rate for rising edges, and the first convergence rate is different from the second convergence rate.

The present disclosure describes a system for estimating lateral force. The system includes sensors, an actuator, and a controller in communication with the sensors and the actuator. The controller is programmed to execute the method described above. The present disclosure also describes a vehicle including a vehicle body, sensors, an actuator, and a controller in communication with the sensors and the actuator. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
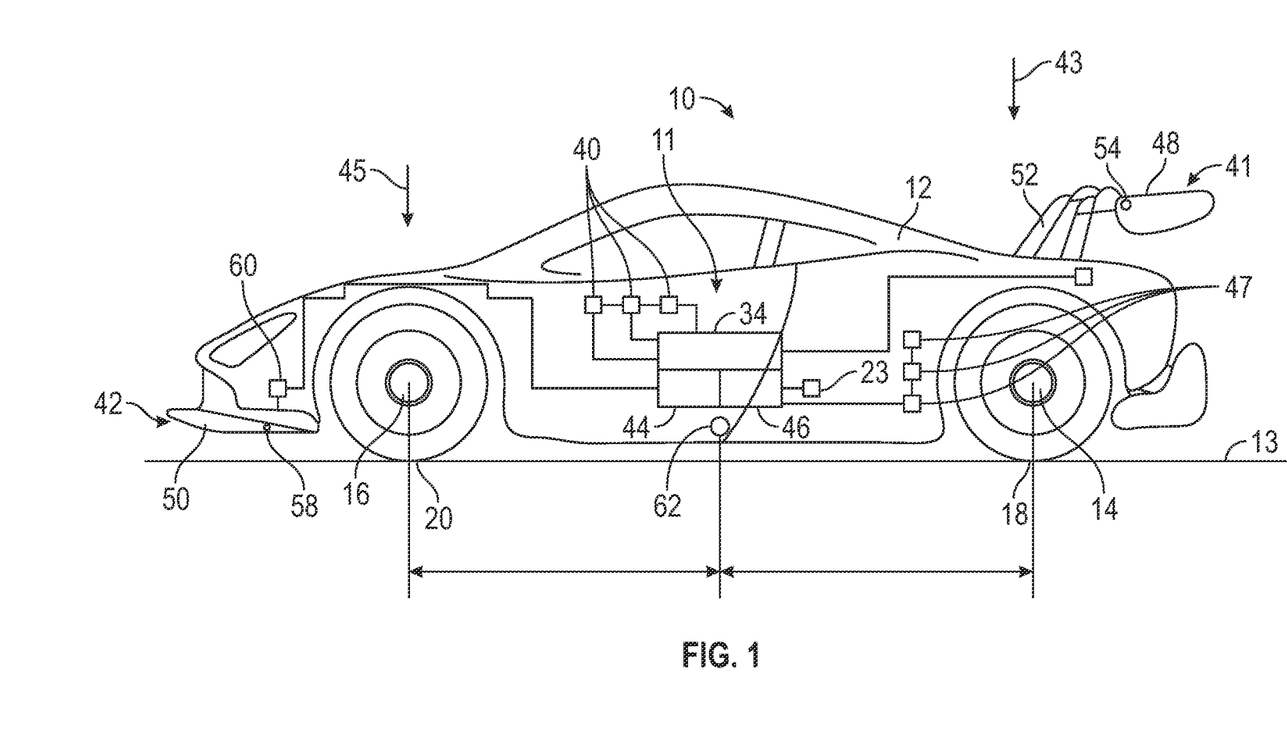
FIG. 1 is a schematic side view of a vehicle including a system for lateral force estimation.

With reference to FIG. 1, a vehicle 10 includes (or is in communication with) a control system 11. While the system 11 is shown inside the vehicle 10, it is contemplated that the system 11 may be outside of the vehicle 10. As a non-limiting example, the system 11 may be in wireless communication with the vehicle 10. Although the vehicle 10 is shown as a coupe, it is envisioned that that vehicle 10 may be another type of vehicle, such as a pickup truck, a sedan, a sport utility vehicle (SUVs), a recreational vehicle (RVs), etc. The system 11 can be used for accurate estimation of tire lateral forces.

Further, the vehicle 10 includes a vehicle controller 34 and one or more sensors 40 in communication with the vehicle controller 34. The sensors 40 collect information and generate sensor data indicative of the collected information. As non-limiting examples, the sensors 40 may include Global Navigation Satellite System (GNSS) transceivers or receivers, inertial measurement unit (IMU), yaw rate sensors, ride height sensors, speed sensors, lidars, radars, ultrasonic sensors, and cameras, among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras may have a field of view large enough to capture images in front, in the rear, and in the sides of the vehicle 10. The ride height sensors are configured to measure the right height of the vehicle 10. The ultrasonic sensor may detect static and/or dynamic objects.

The vehicle controller 34 is programmed to receive sensor data from the sensors 40 and includes at least one processor 44 and a non-transitory computer readable storage device or media 46. The processor 44 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the vehicle controller 34 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10.

Figure 2:
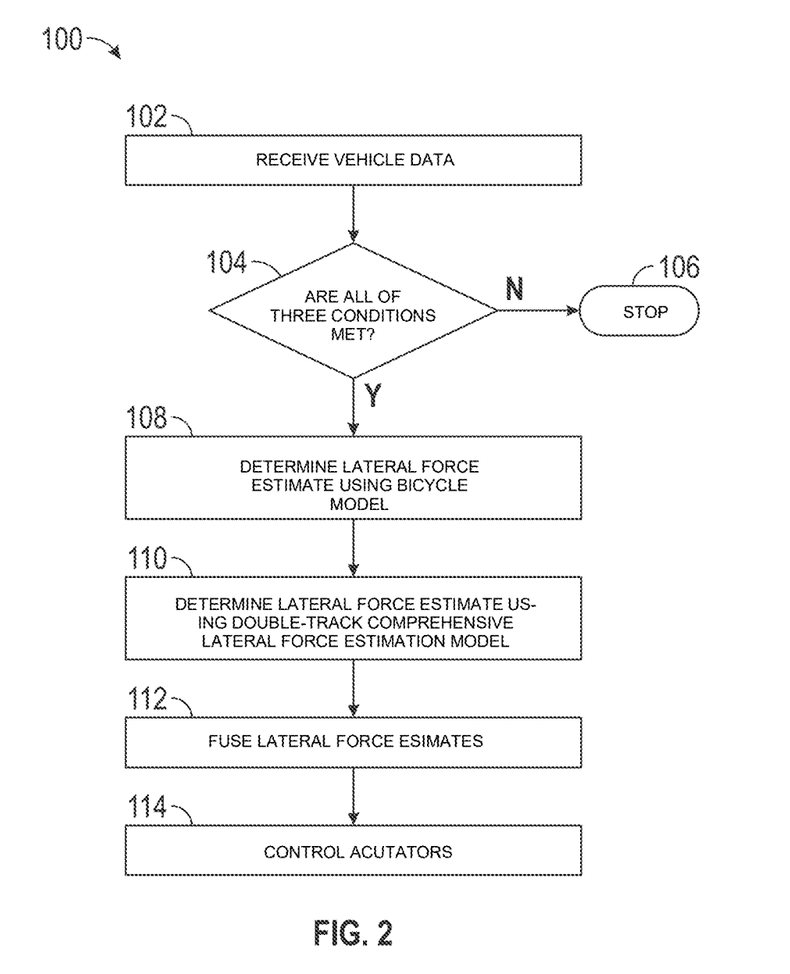
FIG. 2 is a flowchart of a method for lateral force estimation.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators (e.g., first aerodynamic actuator 41 and/or second aerodynamic actuator 42) to automatically control the components of the vehicle 10 based on the logic, calculations, methods, and/or algorithms. Although a single vehicle controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the vehicle controller 34 are embodied in the system 11. The non-transitory computer readable storage device or media 46 includes machine-readable instructions (shown, for example, in FIG. 2), that when executed by the one or more processors, cause the processors 44 to execute the method 100 (FIG. 2).

The vehicle 10 further includes one or more vehicle actuators 47 that control one or more vehicle features such as, but not limited to, the propulsion system, the transmission system, the steering system, and the brake system. In various embodiments, the vehicle features may further include interior and/or exterior vehicle features such as, but are not limited to, doors, a trunk, and cabin features such as air, music, lighting, etc. As non-limiting examples, the vehicle actuators 47 may be an electronic limited slip differential (eLSD), an electronic all-wheel drive (eAWD) system. The vehicle actuators 47 are in communication with the vehicle controller 34. Therefore, the vehicle controller 34 is programmed to control the operation of the vehicle actuators 47.

The vehicle 10 includes a vehicle body 12, a first or rear axle 14, and a second or front axle 16. The front axle 16 and the rear axle 14 are coupled to the vehicle body 12. Further, each of the front axle 16 and the rear axle 14 are configured to rotate relative to the vehicle body 12. The vehicle 10 further includes one or more first or rear tires 18 coupled to the front axle 16 and one or more second or front tires 20 coupled to the rear axle 16. As a non-limiting examples, the vehicle 10 may include two front tires 20 (e.g., a left front tire and a right front tire) and two rear tires 18 (e.g., a left rear tire and a right rear tire).

The vehicle 10 may include a first or rear aerodynamic actuator 41 and a second or front aerodynamic actuator 42 each in communication with the vehicle controller 34. The first aerodynamic actuator 41 includes the first aerodynamic body 48, and the second aerodynamic actuator 42 are considered vehicle actuators 47 and includes a second aerodynamic body 50. Each of the first aerodynamic body 48 and the second aerodynamic body 50 may be configured as a wing-shaped spoiler. In the present disclosure, the term "wing-shaped" is defined as having a shape of a wing, i.e., a fin having a shape of an airfoil defined by a streamlined cross-sectional shape producing lift for flight or propulsion through a fluid. The term "spoiler" means an aerodynamic device capable of disrupting air movement across the vehicle 10 while the vehicle 10 is in motion, thereby reducing drag and/or inducing an aerodynamic downforce on the vehicle 10. The term "downforce" means a force component that is perpendicular to the direction of relative motion of the vehicle 10, i.e., in the longitudinal direction, toward the road surface 13. For example, the spoiler can diffuse air by increasing the amount of turbulence flowing over it. The first aerodynamic actuator 41 is closer to the front axle 16 than to the rear axle 16 to control a rear downforce 43 at or near the front axle 16. The second aerodynamic actuator 42 is closer to the rear axle 16 than to the front axle 16 to control a front downforce 45 at or near the rear axle 16. The rear downforce 43 and the front downforce 45 may be determined using sensor data from the sensors 40 (e.g., ride height sensors).

The first aerodynamic actuator 41 includes a support 52 directly coupled to the vehicle body 12 and one or more first pivots 54 (e.g., pivot pin, pivot mechanism, etc.) pivotally coupling the first aerodynamic body 48 to the vehicle body 12. Accordingly, the first aerodynamic body 48 is movable (e.g., pivotable) relative to the vehicle body 12. The first aerodynamic actuator 41 includes a first electric motor 56 (or another suitable machine) in communication with the vehicle controller 34 and coupled to the first aerodynamic body 48 through the first pivot 54. The vehicle controller 34 is therefore programmed to actuate the first electric motor 56 to move the first aerodynamic body 48 relative to the vehicle body 12.

The second aerodynamic actuator 42 is coupled to the vehicle body 12 and includes one or more second pivots 58 (e.g., pivot pin, pivot mechanism, etc.) pivotally coupling the second aerodynamic body 50 to the vehicle body 12. Accordingly, the second aerodynamic body 50 is movable (e.g., pivotable) relative to the vehicle body 12. The second aerodynamic actuator 42 includes a second electric motor 60 (or another suitable machine) in communication with the vehicle controller 34 and coupled to the second aerodynamic body 50 through the second pivot 58. The vehicle controller 34 is therefore programmed to actuate the second electric motor 60 to move the second aerodynamic body 50 relative to the vehicle body 12.

The vehicle 10 includes a user interface 23 in communication with the vehicle controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification. The user interface 23 is in electronic communication with the vehicle controller 34 and is configured to receive inputs from the hearing-impaired vehicle occupant 25 (e.g., a vehicle user or a vehicle passenger). For example, the user interface 23 may include a touch screen and/or buttons configured to receive inputs from the vehicle occupant. Accordingly, the vehicle controller 34 is configured to receive inputs from the vehicle occupant via the user interface 23 and to provide an output (e.g., audible, haptic, and/or visible notifications) to the vehicle occupant.

FIG. 2 is a flowchart of a method 100 for estimating tire longitudinal and lateral forces. In other methods, the effect of longitudinal tire force on lateral and yaw dynamics of the vehicle are ignored. The method 100 is an integrated estimation method that incorporates the effect of longitudinal force in estimation of lateral force. When the yaw moment generated from difference in each corner or each side of the vehicle 10 is significant, the effect of the longitudinal tire force on lateral tire force estimation should not be ignored. As a result, a more precise estimation of the lateral tire force is obtained by considering the longitudinal tire force, especially at edge cases for performance vehicles.

In an aspect of the present disclosure, the method 100 begins at block 102. At block 102, the vehicle controller 34 receives vehicle data. At least some of the vehicle data may be obtained directly or indirectly from the sensors 40. As non-limiting examples, the vehicle data includes vehicle lateral acceleration, vehicle yaw acceleration, front wheel steering angle on the road, the rear wheel steering angle on the road, the mass of the vehicle 10, the location of the center of gravity 62 of the vehicle, the distance $L_r$ from the rear axle 14 to the center of gravity 62, the distance $L_f$ from the front axle 16 to the center of gravity 62, vehicle speed of the vehicle 10, wheel slip at each of the tires (i.e., the front tires 20 and the rear tires 18), and the yaw moment resulting from the longitudinal forces at each of the tires (i.e., the front tires 20 and the rear tires 18) of the vehicle 10. Then, the method 100 continues to block 104.

At block 104, the vehicle controller 34 determines whether three conditions (i.e., criteria) are met (i.e., a detection law). This detection law is used to decide when to use longitudinal tire force in lateral tire force estimation. This part of the method 100 (i.e., block 104) ensures that the longitudinal force is used only when 1) it is accurately estimated, 2) its effect on lateral and yaw dynamics is significant enough that it should not be ignored. Therefore, the method 100 avoids using the longitudinal tire force in the lateral tire force estimation at all times. The longitudinal tire force is used in lateral tire force estimations only when the three conditions are met. If one or more of the three conditions are not met, then the method 100 proceeds to block 106. At block 106, the method 100 ends and the longitudinal tire forces are not considered when estimating the lateral tire forces of the vehicle 10. If all the three conditions above are met, then the method 100 proceeds to block 108.

The first condition is that the absolute value of the maximum wheel slip of all the wheel slips at each tire (i.e., front tires 20 and rear tires 18) is less than a predetermined wheel-slip threshold. To determine whether the first condition is met, the vehicle controller 34 determines the maximum wheel slip among the wheel slips of all the tires (i.e., the front tires 20 and the rear tires 18) of the vehicle 10. Then, the vehicle controller 34 determines the absolute value of the maximum wheel slip. Next, the vehicle controller 34 compares the absolute value of the maximum wheel slip with a predetermined wheel-slip threshold to determine whether the absolute value of the maximum wheel slip is less than the predetermined wheel-slip threshold. If the absolute value of the maximum wheel slip is less than the predetermined wheel-slip threshold, then the first condition is met.

The second condition is that the vehicle speed of the vehicle is greater than the predetermined speed threshold. To determine whether the second condition is met, the vehicle controller 34 compares the vehicle speed of the vehicle 10 with a predetermined speed threshold to determine whether the vehicle speed of the vehicle 10 is greater than the predetermined speed threshold. If the vehicle speed of the vehicle 10 is greater than the predetermined speed threshold, then the second condition is met.

The third condition is that the yaw moment resulting from the longitudinal forces at each of the tires (i.e., the front tires 20 and the rear tires 18) of the vehicle 10 is greater than a predetermined moment threshold. The yaw moment resulting from the longitudinal forces at each of the tires (i.e., the front tires 20 and the rear tires 18) of the vehicle 10 may be determined using the following equation:

$$M_z^{F_x} = ((F_{xf}\sin\delta_F)L_f - (F_{xr}\sin\delta_R)L_r) + \frac{1}{2}(F_x^{RF} - F_x^{LF})\cos\delta_F L_w + \frac{1}{2}(F_x^{RR} - F_x^{LR})\cos\delta_R L_w$$

where:
$M_z^{F_x}$ is the yaw moment resulting from tire longitudinal forces on the vehicle 10;
$F_{xf}$ is the lumped longitudinal force in the front axle 16;
$\delta_F$ is the front wheel steering angle on the road;
$L_f$ is the distance from front axle 16 to the center of gravity 62 of the vehicle 10;
$F_{xr}$ is the lumped longitudinal force in the rear axle 14;
$\delta_R$ is the rear wheel steering angle on the road;
$L_r$ is the distance from the rear axle 18 to the center of gravity 62 of the vehicle 10;
$F_x^{RF}$ is the longitudinal force on right front tire;
$F_x^{LF}$ is the longitudinal force on left front tire;
$L_w$ is the axle track (e.g. the distance between the hub flanges on the rear axle 14;
$F_x^{RR}$ is the longitudinal force on right rear tire;
$F_x^{LR}$ is longitudinal force on left rear tire;

As described above, it may be useful to determine the yaw moment resulting from the longitudinal forces at each of the tires. Thus, the vehicle controller 34 may employ the following equation to determine the longitudinal tire forces:

$$F_x^{ij} = \eta_{ij} - \frac{K_{p_{ij}}}{R_{ij}}(\omega_{ij} - \hat{\omega}_{ij})$$

where:
i may be left or right to refer to a right tire or a left tire;
j may be front or rear to refer to a front tire or a rear tire;
$F_x^{ij}$ is a longitudinal tire force at the tire i (left or right) and j (front or rear);
$n_{ij}$ is the input observer gain for each wheel speed at each tire i (left or right) and j (front or rear);
$R_{ij}$ is the tire effective radius of the tire i (left or right) and j (front or rear);
$K_{p_{ij}}$ is the observer gain for each wheel speed at the tire i (left or right) and j (front or rear);
$\omega_{ij}$ is the wheel speed at each tire i (left or right) and j (front or rear); and $\hat{\omega}_{ij}$ is the observer state for each wheel speed at the tire i (left or right) and j (front or rear).

At block 104, the vehicle controller 34 determines whether all the conditions are met (i.e., the first condition, the second condition, and the third condition described above). If one or more of the conditions are not met, then the method 100 proceeds to block 106 and the method 100 ends. If all the three conditions are met, then the method 100 continues to block 108.

At block 108, the vehicle controller 34 uses a simplified bicycle model to determine (e.g., estimate) the lateral tire force at each of the tires (e.g., front tires 20 and rear tires 18) of the vehicle 10. The lateral tire forces determined using the simplified bicycle model may be referred to as the first lateral forces. The following equations may be used to determine the lateral tire forces:

$$F_{yf} = \frac{1}{\cos\delta_F}\left(\frac{ma_y L_r + I_{zz}\dot{r}}{L_f + L_r}\right)$$

$$F_{yr} = \frac{1}{\cos\delta_R}\left(\frac{ma_y L_f - I_{zz}\dot{r}}{L_f + L_r}\right)$$

where:
m is the mass of the vehicle 10;
$a_y$ is the lateral acceleration of the vehicle 10;
$\delta_F$ is the front wheel steering angle on the road;
$\delta_R$ is the rear wheel steering angle on the road;
$L_r$ is the distance from the rear axle 14 to the center of gravity 62 of the vehicle 10;
$L_f$ is the distance from the front axle 16 to the center of gravity 62 of the vehicle 10;
$I_{zz}$ is the yaw moment of inertia of the vehicle 10;
$\dot{r}$ is the yaw acceleration of the vehicle 10;
$F_{yf}$ the lumped lateral force in the front axle 16; and
$F_{yr}$ is the lumped lateral force in the rear axle 14.

The vehicle controller 34 also executes block 110. Block 110 may be executed before, after, or simultaneously with block 108.

At block 110, the vehicle controller 34 determines a double-track comprehensive lateral force estimation model (i.e., the double-track model) to determine (e.g., estimate) the lateral tire force at each of the tires (e.g., front tires 20 and rear tires 18) of the vehicle 10. The lateral tire forces determined using the double-track model may be referred to as the second lateral forces. The following equations may be used to determine the lateral tire forces:

$$F_{yf} = \frac{1}{\cos\delta_f}\left(\frac{ma_y L_r + I_{zz}\dot{r} - M_z^{EXT}(F_{x_{i,j}})}{L_f + L_r} - F_{xf}\sin\delta_f\right)$$

$$F_{yr} = \frac{1}{\cos\delta_r}\left(\frac{ma_y L_f - I_{zz}\dot{r} + M_z^{EXT}(F_{x_{i,j}})}{L_f + L_r} - F_{xr}\sin\delta_r\right)$$

where:
$M_z^{EXT}$ is the yaw moment resulting from the difference in tire longitudinal force between the left and right sides of the vehicle 10;
$F_{yf}$ is the lumped lateral force in the front axle 16 of the vehicle 10;
$F_{yr}$ is the lumped lateral force in the rear axle 14 of the vehicle 10;
m is a mass of the vehicle;
$a_y$ is a lateral acceleration of the vehicle;

$\dot{r}$ is a yaw acceleration of the vehicle;
$I_{zz}$ is a yaw moment of inertia of the vehicle 10;
$M_z^{EXT}$ is the yaw moment resulting from tire longitudinal forces on the vehicle;
i refers to a left tire or a right tire of the vehicle 10;
j refers to a front tire or a rear axle of the vehicle 10; Fri is a tire longitudinal force at an axle j and a tire i;
$F_{xi,j}$ is the lumped longitudinal force in the front axle of the vehicle 10;
$F_{xf}$ is a front wheel steering angle on the road;
$\delta_R$ is the rear wheel steering angle on the road;
$L_r$ is the distance from the rear axle 14 to the center of gravity 62 of the vehicle 10; and
$L_f$ is the distance from the front axle 16 to the center of gravity 62 of the vehicle 10.

After executing block 108 and block 110, the method 100 proceeds to block 112. At block 112, the vehicle controller 34 fuses the lateral tire forces determined using the simplified bicycle model (i.e., the first lateral forces) and the lateral tire forces determined using the double-track model (i.e., the second lateral forces) to determine third lateral forces at each of the plurality of tires of the vehicle 10. The third lateral forces are more accurate than the previously determined first and second lateral forces. The vehicle controller 34 may use a fusion algorithm to fuse the lateral tire forces determined using the simplified bicycle model (i.e., the first lateral forces) and the lateral tire forces determined using the double-track model (i.e., the second lateral forces). The fusion algorithm may include a low pass filter to smoothen the transition between the two methods. The first low pass filter has a first convergence rate for the falling edge and a second convergence rate for rising edges, wherein the first convergence rate is different from the second convergence rate. After using the low pass filter, the fusion algorithm may also include multiplying the lateral tire forces determined using the double-track model (i.e., the second lateral forces) by a predetermined factor and then adding the lateral tire forces determined using the simplified bicycle model (i.e., the first lateral forces) to the result of the multiplication to determine the third lateral forces at each of the plurality of tires of the vehicle 10. Then, the method 100 continues to block 114.

At block 114, the vehicle controller 34 uses the third lateral forces at each of the plurality of tires of the vehicle 10 to control one or more actuators. For example, the third lateral forces may be used in both feedback and feedforward control systems that use tire force estimation. A more accurate tire force estimation will affect the performance of these control systems. The third lateral forces may also be used to control an eLSD, and/or eAWD system.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for estimating lateral force, comprising:
receiving vehicle data of a vehicle, wherein the vehicle includes a plurality of tires;
using a bicycle model to determine a respective first lateral force at each of the plurality of tires of the vehicle for each individual tire;
using a double-track model to determine a respective second lateral force at each of the plurality of tires of the vehicle for each individual tire;
fusing the first lateral forces determined using the bicycle model and the second lateral forces using the double-track model to determine a respective third lateral force at each of the plurality of tires of the vehicle for each individual tire; and
controlling an actuator of the vehicle using the third lateral forces at each of the plurality of tires of the vehicle.

2. The method of claim 1, wherein the vehicle data includes a plurality of wheel slips at each of the plurality of tires of the vehicle, and the method further comprises:
determining a maximum wheel slip of the plurality of wheel slips at each of the plurality of tires of the vehicle;
determining an absolute value of the maximum wheel slip; and
comparing the absolute value of the maximum wheel slip with a predetermined wheel-slip threshold to determine whether the absolute value of the maximum wheel slip is less than the predetermined wheel-slip threshold.

3. The method of claim 2, wherein the vehicle data includes a vehicle speed of the vehicle, and the method further comprises:
comparing the vehicle speed of the vehicle with a predetermined speed threshold to determine whether the vehicle speed of the vehicle is greater than the predetermined speed threshold.

4. The method of claim 3, wherein the vehicle data includes a yaw moment resulting from the longitudinal forces at each of the plurality of tires of the vehicle, and the method further comprises:
comparing the yaw moment resulting from the longitudinal forces at each of the plurality of tires of the vehicle with a predetermined moment threshold to determine whether the yaw moment resulting from the longitudinal forces at each of the plurality of tires of the vehicle is greater than the predetermined moment threshold.

5. The method of claim 4, wherein the first lateral forces at each of the plurality of tires of the vehicle and the second lateral forces at each of the plurality of tires of the vehicle are determined solely in response to determining that: (a) the absolute value of the maximum wheel slip is less than the wheel-slip threshold, (b) the vehicle speed of the vehicle is greater than the predetermined speed threshold, and (c) the yaw moment resulting from the longitudinal forces at each of the plurality of tires of the vehicle is greater than the predetermined moment threshold.

6. The method of claim 5, wherein the second lateral forces at each of the plurality of tires of the vehicle includes a lumped lateral force in a front axle of the vehicle, and the double-track model uses a following equation:

$$F_{yf} = \frac{1}{\cos\delta_f}\left(\frac{ma_y L_r + I_{zz}\dot{r} - M_z^{EXT}(F_{x_{i,j}})}{L_f + L_r} - F_{xf}\sin\delta_f\right)$$

where:
$F_{yf}$ is the lumped lateral force in the front axle of the vehicle;
m is a mass of the vehicle;
$a_y$ is a lateral acceleration of the vehicle;
$\dot{r}$ is a yaw acceleration of the vehicle;
$L_r$ is a distance from the rear axle to a center of gravity of the vehicle;
$I_{zz}$ is a yaw moment of inertia of the vehicle;
$M_z^{EXT}$ is the yaw moment resulting from tire longitudinal forces on the vehicle;
i refers to a left tire or a right tire of the vehicle;
j refers to a front tire or a rear axle of the vehicle;
$F_{x_{i,j}}$ a tire longitudinal force at an axle j and a tire i;
$F_{xf}$ is the lumped longitudinal force in the front axle of the vehicle;
$\delta_f$ is a front wheel steering angle on a road; and
$L_f$ is a distance from the front axle to the center of gravity of the vehicle.

7. The method of claim 6, wherein the second lateral forces at each of the plurality of tires of the vehicle includes a lumped lateral force in a rear axle of the vehicle, and the double-track model uses a following equation:

$$F_{yr} = \frac{1}{\cos\delta_r}\left(\frac{ma_y L_f - I_{zz}\dot{r} + M_z^{EXT}(F_{x_{i,j}})}{L_f + L_r} - F_{xr}\sin\delta_r\right)$$

where:
$F_{yr}$ is the lumped lateral force in the rear axle of the vehicle;
m is the mass of the vehicle;
$a_y$ is the lateral acceleration of the vehicle;
$\dot{r}$ is the yaw acceleration of the vehicle;
$L_r$ is the distance from the rear axle to the center of gravity of the vehicle;
$I_{zz}$ is the yaw moment of inertia of the vehicle;
$M_z^{EXT}$ is the yaw moment resulting from tire longitudinal forces on the vehicle;
i refers to the left tire or the right tire of the vehicle;
j refers to the front tire or the rear axle of the vehicle;
$F_{x_{i,j}}$ is the tire longitudinal force at the axle j and the tire i;
$F_{xr}$ is the lumped longitudinal force in the rear axle of the vehicle;
$\delta_r$ is a rear wheel steering angle on a road; and
$L_f$ is a distance from the front axle to the center of gravity of the vehicle.

8. The method of claim 7, wherein fusing the first lateral forces determined using the bicycle model and the second lateral forces using the double-track model including using a low pass filter.

9. The method of claim 8, wherein the low pass filter has a first convergence rate for the falling edge, the low pass filter has a second convergence rate for rising edges, and the first convergence rate is different from the second convergence rate.

10. A system for estimating lateral force, comprising:
a plurality of sensors;
an actuator; and a controller in communication with the plurality of sensors and the actuator, wherein the controller is programmed to:
receive vehicle data from sensors of a vehicle, wherein the vehicle includes a plurality of tires;
use a bicycle model to determine a respective first lateral force at each of the plurality of tires of the vehicle for each individual tire,
use a double-track model to determine a respective second lateral force at each of the plurality of tires of the vehicle for each individual tire;
fuse the first lateral forces determined using the bicycle model and the second lateral forces using the double-track model to determine a respective third lateral force at each of the plurality of tires of the vehicle for each individual tire; and
control the actuator using the third lateral forces at each of the plurality of tires of the vehicle.

11. The system of claim 10, wherein the vehicle data includes a plurality of wheel slips at each of the plurality of tires of the vehicle, and the controller is programmed to:
determine a maximum wheel slip of the plurality of wheel slips at each of the plurality of tires of the vehicle;
determine an absolute value of the maximum wheel slip; and
compare the absolute value of the maximum wheel slip with a predetermined wheel-slip threshold to determine whether the absolute value of the maximum wheel slip is less than the wheel-slip threshold.

12. The system of claim 11, wherein the vehicle data includes a vehicle speed of the vehicle, and the controller is programmed to:
compare the vehicle speed of the vehicle with a predetermined speed threshold to determine whether the vehicle speed of the vehicle is greater than the predetermined speed threshold.

13. The system of claim 12, wherein the vehicle data includes a yaw moment resulting from the longitudinal forces at each of the plurality of tires of the vehicle, and controller is programmed to:
compare the yaw moment resulting from the longitudinal forces at each of the plurality of tires of the vehicle with a predetermined moment threshold to determine whether the yaw moment resulting from the longitudinal forces at each of the plurality of tires of the vehicle is greater than the predetermined moment threshold.

14. The system of claim 13, wherein the first lateral forces at each of the plurality of tires of the vehicle and the second lateral forces at each of the plurality of tires of the vehicle are determined solely in response to determining that: (a) the absolute value of the maximum wheel slip is less than the wheel-slip threshold, (b) the vehicle speed of the vehicle is greater than the predetermined speed threshold, and (c) the yaw moment resulting from the longitudinal forces at each of the plurality of tires of the vehicle is greater than the predetermined moment threshold.

15. The system of claim 14, wherein the second lateral forces at each of the plurality of tires of the vehicle includes a lumped lateral force in a front axle of the vehicle, and the double-track model uses a following equation:

$$F_{yf} = \frac{1}{\cos\delta_f}\left(\frac{ma_y L_r + I_{zz}\dot{r} - M_z^{EXT}(F_{x_{i,j}})}{L_f + L_r} - F_{xf}\sin\delta_f\right)$$

where:

$F_{yf}$ is the lumped lateral force in the front axle of the vehicle;
m is a mass of the vehicle;
$a_y$ is a lateral acceleration of the vehicle;
$\dot{r}$ is a yaw acceleration of the vehicle;
$L_r$ is a distance from the rear axle to a center of gravity of the vehicle;
$I_{zz}$ is a yaw moment of inertia of the vehicle;
$M_z^{EXT}$ is the yaw moment resulting from tire longitudinal forces on the vehicle;
i refers to a left tire or a right tire of the vehicle;
j refers to a front tire or a rear axle of the vehicle;
$F_{x_{i,j}}$ is a tire longitudinal force at an axle j and a tire i;
$F_{xf}$ is the lumped longitudinal force in the front axle of the vehicle;
$\delta_f$ is a front wheel steering angle on a road; and
$L_f$ is a distance from the front axle to the center of gravity of the vehicle.

16. The system of claim 15, wherein the second lateral forces at each of the plurality of tires of the vehicle includes a lumped lateral force in a rear axle of the vehicle, and the double-track model uses a following equation:

$$F_{yr} = \frac{1}{\cos\delta_r}\left(\frac{ma_y L_f - I_{zz}\dot{r} + M_z^{EXT}(F_{x_{i,j}})}{L_f + L_r} - F_{xr}\sin\delta_r\right)$$

where:
$F_{yr}$ is the lumped lateral force in the rear axle of the vehicle;
m is the mass of the vehicle;
$a_y$ is the lateral acceleration of the vehicle;
$\dot{r}$ is the yaw acceleration of the vehicle;
$L_r$ is the distance from the rear axle to the center of gravity of the vehicle;
$I_{zz}$ is the yaw moment of inertia of the vehicle;
$M_z^{EXT}$ is the yaw moment resulting from the difference in tire longitudinal force between the left and right sides of the vehicle;
i refers to the left tire or the right tire of the vehicle;
j refers to the front tire or the rear axle of the vehicle;
$F_{x_{i,j}}$ is the tire longitudinal force at the axle j and the tire i;
$F_{xr}$ is the lumped longitudinal force in the rear axle of the vehicle;
$\delta_r$ is a rear wheel steering angle on a road; and
$L_f$ is a distance from the front axle to the center of gravity of the vehicle.

17. The system of claim 16, wherein the controller is programmed to use a low pass filter to fuse the first lateral forces determined using the bicycle model and the second lateral forces using the double-track model.

18. The system of claim 17, wherein the low pass filter has a first convergence rate for the falling edge, the low pass filter has a second convergence rate for rising edges, and the first convergence rate is different from the second convergence rate.

19. A vehicle, comprising:
a vehicle body;
an actuator coupled to the vehicle body;
a plurality of sensors coupled to the vehicle body;
a controller in communication with the actuator and the plurality of sensors, wherein the controller is programmed to:
receive vehicle data from sensors of a vehicle, wherein the vehicle includes a plurality of tires;

use a bicycle model to determine a respective first lateral force at each of the plurality of tires of the vehicle for each individual tire, use a double-track model to determine a respective second lateral force at each of the plurality of tires of the vehicle for each individual tire;

fuse the first lateral forces determined using the bicycle model and the second lateral forces using the double-track model to determine a respective third lateral force at each of the plurality of tires of the vehicle for each individual tire; and control the actuator using the third lateral forces at each of the plurality of tires of the vehicle.

20. The vehicle of claim 19, wherein the vehicle data includes a plurality of wheel slips at each of the plurality of tires of the vehicle, and the controller is programmed to:

determine a maximum wheel slip of the plurality of wheel slips at each of the plurality of tires of the vehicle;

determine an absolute value of the maximum wheel slip; and compare the absolute value of the maximum wheel slip with a predetermined wheel-slip threshold to determine whether the absolute value of the maximum wheel slip is less than the wheel-slip threshold.

* * * * *